United States Patent [19]
Onuma et al.

[11] 4,036,081
[45] July 19, 1977

[54] OVERDRIVE MECHANISM FOR AUTOMOTIVE POWER TRANSMISSION

[75] Inventors: Kiyoshi Onuma; Syuji Nagano, both of Toyota, Japan

[73] Assignee: Toyota Jidosha Kogyo Kabushiki Kaisha, Toyota, Japan

[21] Appl. No.: 590,130

[22] Filed: June 25, 1975

[30] Foreign Application Priority Data

Mar. 6, 1975 Japan .................. 50-26544

[51] Int. Cl.² ............... F16H 3/04; F16H 47/08; F16H 57/10
[52] U.S. Cl. ...................... 74/781 R; 74/688
[58] Field of Search ............ 74/687, 688, 781 R

[56] References Cited

U.S. PATENT DOCUMENTS

| | | | |
|---|---|---|---|
| 3,354,746 | 11/1967 | Paredes | 74/688 |
| 3,463,033 | 8/1969 | Fisher | 74/688 |
| 3,473,411 | 10/1969 | Paredes | 74/688 |
| 3,491,617 | 1/1970 | Konrad | 74/688 |
| 3,584,520 | 6/1971 | Borman | 74/688 |
| 3,597,999 | 8/1971 | Fisher | 74/688 |
| 3,665,787 | 5/1972 | Wilkinson | 74/687 |
| 3,772,939 | 11/1973 | Hause | 74/688 |
| 3,884,095 | 5/1975 | Miyao | 74/687 |

*Primary Examiner*—Martin P. Schwadron
*Assistant Examiner*—Abraham Hershkovitz
*Attorney, Agent, or Firm*—Finnegan, Henderson, Farabow & Garrett

[57] ABSTRACT

An overdrive mechanism is provided for use in an automatic transmission of the type including a torque converter and a change gear mechanism. The torque converter has a pump impeller obtaining its input from an engine and a turbine runner whose output is applied to a shaft of the change gear mechanism.

The overdrive mechanism is disposed between the torque converter and the change gear mechanism and is responsive to the operation of the change gear mechanism. The overdrive mechanism includes a planetary gear train having a sun gear fixed stationary, a carrier operatively responsive to the pump impeller of the torque converter, and a ring gear operatively connected to the sun gear and carrier so that it at all times has output power of a rotational speed greater than that of the engine. An overdrive clutch is provided that connects the shaft of the change gear mechanism to the pump impeller of the torque converter through the ring gear and planetary gear train to thereby by-pass the turbine runner of the torque converter.

This device provides for fuel efficiency by eliminating fluid turbulence in the torque converter during this overdrive condition.

6 Claims, 2 Drawing Figures

OVERDRIVE MECHANISM FOR AUTOMOTIVE POWER TRANSMISSION

BACKGROUND OF THE INVENTION

This invention relates to an overdrive mechanism for use in an automatic transmission of a vehicle such as an automobile.

More particularly, this invention relates to an overdrive mechanism for an automatic transmission of the type incorporating a hydraulic torque converter disposed between an engine and a change gear mechanism.

The conventional torque converter of an automatic transmission varies the turning force automatically and in a smooth and stepless fashion in accordance with the resistance of the vehicle. However, the conventional torque converter is severely limited in a practical sense because of considerable energy loss arising inevitably from fluid friction during the passage of fluid through the torque converter or from turbulence caused by a drastic change in the direction of flow of the fluid. Should a conventional overdrive device be employed in this type of automatic transmission, no satisfactory improvement in fuel efficiency can be attained because the engine power is transmitted automatically through the torque converter at the time of overdrive.

Accordingly, it is a primary object of this invention to provide a new and improved overdrive mechanism which eliminates the above-described problems of the conventional torque converter transmission.

It is a further object of this invention to provide an overdrive mechanism which mechanically transmits the engine power to the change gear mechanism with an improved fuel efficiency by not passing through the torque converter.

Another object of this invention is to minimize the fluctuations in the rotational force by the torque converter when not required. This usually occurs during a constant high speed operation of the engine for a long period such as in overdrive.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the foregoing objects and in accordance with the purpose of the invention, as embodied and broadly described herein, the overdrive mechanism of this invention is for automatic transmissions of the type including a change gear mechanism having an input shaft, and a torque converter having an input element connected to an engine and an output element connected to the shaft, and comprises (1) a planetary gear train including (a) a sun gear affixed to the housing of the automatic transmission, (b) a carrier operatively responsive to the input element of the torque converter, and (c) a ring gear operatively connected to the sun gear and the carrier to thereby be operatively responsive to the input element of the torque converter; (2) overdrive clutch means operatively connected to the shaft of the change gear mechanism and activated in response to the operation of the change gear mechanism for engaging the ring gear whereby the shaft of the change gear mechanism is rotated by movement of the ring gear in response to movement of the input element of the torque converter; and (3) a one-way clutch connecting the output element of the torque converter to the shaft of the change gear mechanism, the one-way clutch decoupling the shaft from the output element when the speed of the shaft exceeds that of the output element.

The invention consists in the novel parts, constructions, arrangements, combinations and improvements shown and described. The accompanying drawings, which are incorporated in and constitute a part of this specification, illustrate an embodiment of the invention and, together with the description, serve to explain the principles of the invention.

DETAILED DESCRIPTION OF THE DRAWINGS

Reference will now be made in detail to the present preferred embodiment of the invention, an example of which is illustrated in the accompanying drawings.

Figure 1:
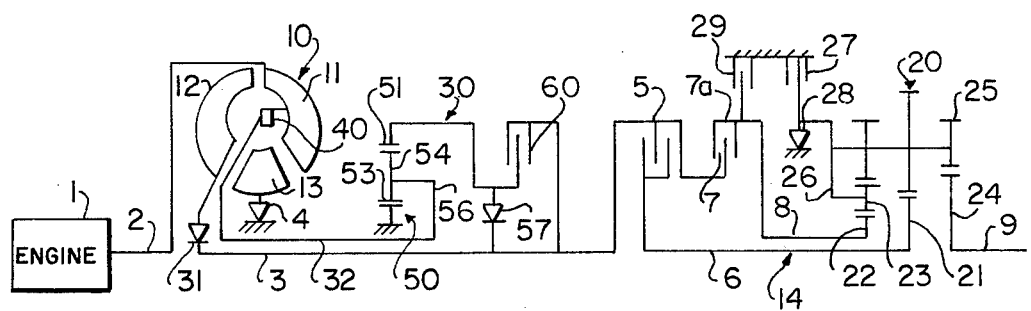
FIG. 1 is a schematic diagram illustrating an embodiment of an automatic transmission employing the teachings of this invention.

Referring now to FIG. 1, an automatic transmission, as well known in the art, is schematically shown. A crank shaft 2 of an engine 1 is connected to a pump impeller 11 of a hydraulic torque converter 10. A turbine runner 12 of torque converter 10 is operatively connected to an input shaft 3 of a change gear mechanism 14. A stator 13 is interposed between pump impeller 11 and turbine runner 12, and supported by a one-way clutch 4 so as to rotate only in one direction. The input shaft 3 is further connected through a front clutch 5 to an intermediate shaft 6 and through a rear clutch 7 to another intermediate shaft 8. Between intermediate shafts 6 and 8, and an output shaft 9, is disposed a planetary gear unit 20.

This planetary gear unit 20 consists of first and second sun gears 21 and 22 which are respectively mounted on the intermediate shafts 6 and 8. A short pinion 23 engages with second sun gear 22, and a long pinion 25 engages with short pinion 23, first sun gear 21 and a gear 24 of output shaft 9. A carrier 26 rotatably supports short and long pinions 23 and 25.

A combined first and reverse brake 27 and a one-way clutch 28 are mounted on carrier 26. A second brake 29 is mounted on a rear clutch drum 7a and is made integral with second sun gear 22. The construction of the above-described change gear mechanism is more fully disclosed in U.S. Pat. No. 3,714,847, assigned to the same firm as in this application.

In accordance with the present invention, an overdrive mechanism 30 is provided in the automatic transmission of the above-described type between the torque converter 10 and the change gear mechanism 14.

Figure 2:
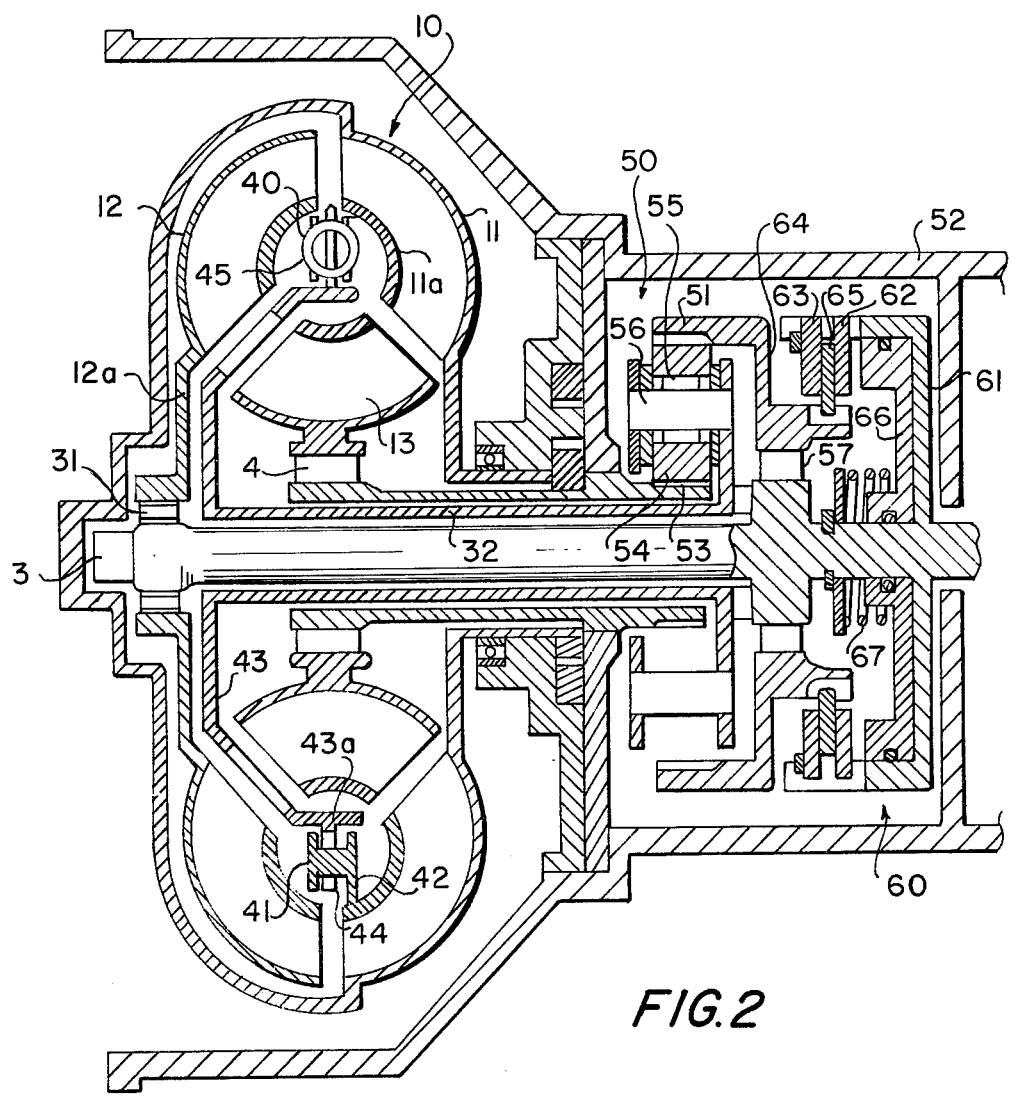
FIG. 2 is a sectional view showing the overdrive mechanism of this invention.

As here embodied, and as best seen in FIG. 2, one-way clutch 31 is provided between the input shaft 3 and an external surface 12a of the casing of the turbine runner 12 in such a fashion that turbine runner 12 is engaging the clutch only when turbine runner 12 is operating at a higher speed than input shaft 3. An internal surface 11a of the casing of pump impeller 11 is connected mechanically through torsional damper 40 to an intermediate shaft 32 which is disposed coaxially outside of the input shaft 3. Between intermediate shaft 32 and input shaft 3 is positioned a single planetary gear train 50, a one-way clutch 57 and an overdrive clutch 60.

Preferably, torsional damper 40 comprises a connection plate 42 adapted to the internal surface 11a of the casing of pump impeller 11. Connection plate 42 has a number of teeth 41 defined on the periphery thereof. A flange 43 extends from the vicinity of connection plate 42 through the spacing between turbine runner 12 and stator 13, and is then connected to intermediate shaft 32. Engaging means such as plate 44 is mounted onto the outer peripheral section 43a of flange 43 and engages integrally with teeth 41 in a direction of rotation. A torsion spring 45 is interposed between teeth 41 and engaging means 44 so as to mitigate the shock at the time of power transmission. As can be seen from this assembly, torsional damper 40 function to mechanically transmit the power from pump impeller 11 to intermediate shaft 32.

Preferably, single planetary gear train 50 is comprised of a ring gear 51, a sun gear 53 fixed to the casing 52 of the automatic transmission, a pinion 54 which engages both ring gear 51 and sun gear 53, and a carrier 56 which is operatively connected to the intermediate shaft 32 and supports rotatably the pinion 54 through a needle roller 55. With this arrangement, the single planetary gear train 50 is operable to continuously turn ring gear 51 with greater rotational speed than that of the engine provided through carrier 56.

Overdrive clutch 60 may comprise the same construction with those of the aforementioned clutches 5 and 7. A disc 65 mounted on a hub 64 carrying the ring gear 51 is positioned between a plate 62 and a flange 63 that are secured to a drum 61. Drum 61 in turn is operatively connected to shaft 3 of the change gear mechanism. When a piston 66 located within drum 61 is hydraulically actuated against the force of a return spring 67, plate 62 and flange 63 engage disc 65 to provide an integral coupling between ring gear 51 and shaft 3. It is preferred that one-way clutch 57 be located between hub 64 having ring gear 51 and the input shaft 3, and that it effect engaging action when the rotational speed of input shaft 3 exceeds that of ring gear 51.

When the vehicle is being run by engine power, the power of crank shaft 2 of the engine is transmitted hydraulically from pump impeller 11 of torque converter 10 to turbine runner 12. Turbine runner 12 in turn provides an input to shaft 3 through one-way clutch 31 since clutch 31 since effects engaging action with turbine runner 12 when turbine runner 12 is rotating at a higher speed than the input shaft 3. Simultaneously, the power of pump impeller 11 of torque converter 10 is applied to carrier 56 of single planetary gear train 50 through torsional damper 40 and intermediate shaft 32. Carrier 56 turns pinion 54 about the fixed sun gear 53 so that ring gear 51 rotates at a higher speed than that of the engine. Since overdrive clutch 60 and one-way clutch 57 are not actuated during this time, they are not in an engaging position with ring gear 51.

During operation of the automatic transmission, the power of input shaft 3 is input to the drum side of front clutch 5 and the hub side of rear clutch 7. This power is further transmitted to first sun gear 21 of planetary gear unit 20 through the intermediate shaft 6 by means of the engaging action of front clutch 5. If carrier 26 is locked by the action of one-way clutch 28 or the combined first and reverse brake 27, output shaft 9 is furnished with the output of the first or low speed running condition of a maximum gear ratio. Likewise, if second sun gear 22 is locked by the action of second brake 29, output shaft 9 is furnished with the second speed running condition of a gear ratio that is smaller than that of the first speed. Further, if the engine power is also input to second sun gear 22 through intermediate shaft 8 be engaging action of front clutch 5, the planetary gear unit 20 is integrated so that a high speed rotation of input shaft 3 is transmitted as such to output shaft 9. In this event, a shift to the third speed running condition occurs.

However, when the power of input shaft 3 is input to second sun gear 22 by the engaging action of rear clutch 7, and carrier 26 is locked by the action of the combined first and reverse brake 27, output shaft 9 is supplied with a reversed speed running condition.

Three forward and one reverse speeds are possible by selective activation of clutches 5 and 7, brakes 27 and 29, and one-way clutch 28. When, under the third speed condition, input and output shafts 3 and 9 are connected directly with each other by the action of the two clutches 5 and 7, the overdrive clutch 60 is activated to connect ring gear 51 with input shaft 3. Ring gear 51 up to now has been rotating in single planetary gear train 50 in an idling condition. By this engagement, the higher rotational speed of ring gear 51 is transmitted to input shaft 3 so that input shaft 3 is caused to rotate with a larger number of revolutions than that of the engine.

In this manner, one-way clutch 31 disengages torque runner 12 from input shaft 3 as input shaft comes to a higher speed. Engine power transmitted hydraulically through a fluid from pump impeller 11 of torque converter 10 to turbine runner 12 is not transmitted to input shaft 3. Instead, the engine power is transmitted mechanically from pump impeller 11 to intermediate shaft 32, and into planetary gear train 50. Since the higher rotational speed of ring gear 51 is taken up at input shaft 3, the power is subsequently transmitted directly to shaft 9, thus establishing the overdrive condition.

In a vehicle wheel drive situation during any of the running conditions previously mentioned, one-way clutch 31 disengages torque runner 12 from input shaft 3. Therefore, the transmission of power is prevented from input shaft 3 to turbine runner 12 of torque converter 10. However, ring gear 51 is rotating at a high speed by the driving power which is being mechanically transmitted from pump impeller 11. As the difference between the number of rotations of input shaft 3 driven by the wheels becomes higher than that of ring gear 51, one-way clutch 57 is actuated.

As a result of this situation, one-way clutch 57 effects engaging action between ring gear 51 and input shaft 3. By doing so, the power of input shaft 3 is transmitted through one-way clutch 57, single planetary gear train 50, intermediate shaft 32, and pump impeller 11 to the engine. This establishes a braking force on the engine. In an overdrive condition, an engine brake can always be effectuated since the driving power is transmitted from the outset without resorting to one-way clutch 31, and since ring gear 51 and input shaft 3 are connected with each other through overdrive clutch 60.

As shown in this preferred embodiment of the invention, transmission of power is possible without passing through torque converter 10 at the time of overdrive. Accordingly, the poor performance of a torque converter is significantly minimized during an overdrive condition, and fuel efficiency is greatly improved. At the same time, the effect of multiplying the engine rotational speed to the change gear mechanism is acccomplished.

In accordance with the present invention, transmission of power is quickly and easily changeable by mere manipulation of overdrive clutch 60 from the ordinary transmission through torque converter 10 to a mechanical transmission by-passing torque converter 10. This phenomenon eliminates the use of a turning element effecting a relative rotation inside the torque converter 10 so that loss of energy due to agitation of the fluid by such a turning element is eliminated. This further ensures a highly efficient working condition of torque converter 10.

It should be noted that the overdrive mechanism 30 of this invention can be applied to a change gear mechanism other than the one described in this preferred embodiment. Additionally, the positioning of one-way clutch 31 and torsional damper 40 need not be limited specifically to that illustrated in this preferred embodiment.

It will be apparent to those skilled in the art that various modifications and variations could be made in the overdrive device of the invention without departing from the scope or spirit of the invention.

What is claimed is:

1. An improved automatic transmission with an overdrive device for an engine having a driving member comprising:
   a. a change gear mechanism having:
      i. an input shaft,
      ii. a planetary gear train, and
      iii. a plurality of frictional engagement means for interconnecting said input shaft to said planetary gear train;
   b. a torque converter having:
      i. a pump impeller connected to the driving member of the engine,
      ii. a turbine runner connected to said input shaft of said change gear mechanism,
      iii. a stator located between said pump impeller and said turbine runner, and
      iv. a converter housing for enclosing said pump impeller, said turbine runner, and said stator in fluid flow relationship therein;
   c. an overdrive device positioned outside of said converter housing between said torque converter and said change gear mechanism, said device having:
      i. an overdrive gear train including a sun gear affixed to the housing of said automatic transmission, a carrier responsive to said pump impeller, a ring gear, and a pinion rotatably supported by said carrier and engaging said ring gear and said sun gear, said ring gear thereby being responsive to said pump impeller and rotating at a higher speed than said pump impeller,
      ii. overdrive clutch means connected to said input shaft of said change gear mechanism outside of said converter housing and activated in response to the operation of said change gear mechanism for engaging said ring gear whereby said input shaft of said change gear mechanism rotates with said ring gear in response to movement of said pump impeller, and
      iii. an intermediate shaft rotatably and co-axially disposed around said input shaft of said change gear mechanism having a first end connected to said pump impeller in said converter housing and a second end extending out of said converter housing and connected to said carrier; and
   e. a one-way clutch connecting said turbine runner to said input shaft, said one-way clutch decoupling said shaft from said turbine runner when the speed of said input shaft exceeds that of said turbine runner.

2. The improved transmission of claim 1 wherein said overdrive clutch means is integrally attached to said input shaft of said change gear mechanism for rotation therewith.

3. The improved transmission of claim 1 further including a torsional damper, said damper comprising (i) a connection plate formed upon the internal surface of said pump impeller, said plate having teeth on the periphery thereof, (ii) a flange connected to said first end of said intermediate shaft, (iii) means mounted on the periphery of said flange for engaging the teeth of said connection plate, and (iv) a torsion spring interposed between said teeth and said engaging means so as to mitigate shock during power transmission.

4. The improved transmission of claim 1 wherein said overdrive clutch means includes a clutch having a drum connected to said shaft of said change gear mechanism, for rotation therewith, a plate secured to said drum, a piston within said drum for hydraulic operation in response to actuation by the change gear mechanism, a flange secured to said drum; and said overdrive device further including a hub for carrying said ring gear, said hub having a disc mounted thereon and positioned between said plate and said flange of said drum so that when said piston is actuated, the plate and flange engage said disc to thereby engage said ring gear with said clutch.

5. The improved transmission of claim 1 wherein said overdrive device further includes a one-way clutch located adjacent to said hub for effecting engaging action with said hub when the rotaional speed of said input shaft of said change gear mechanism exceeds that of said ring gear.

6. The improved transmission of claim 4 wherein said overdrive gear train is positioned immediately adjacent said converter housing and said overdrive clutch means is positioned adjacent said overdrive gear train, said overdrive gear train and overdrive clutch means being outside the fluid flow of said torque converter and in concentric relationship with said input shaft of said change gear mechanism.

* * * * *